Sept. 17, 1963 C. W. STRUCK 3,104,226
SHORT LUMINESCENCE DELAY TIME PHOSPHORS
Filed May 29, 1961
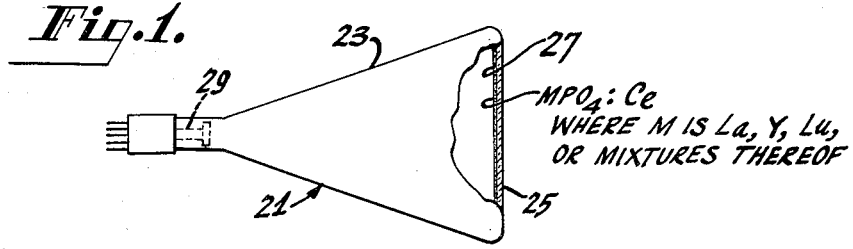
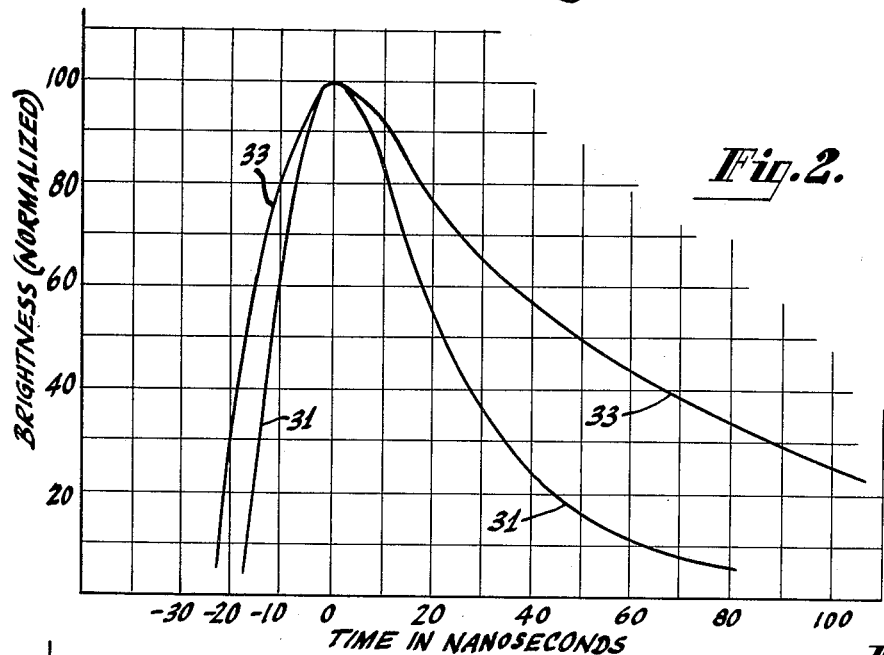
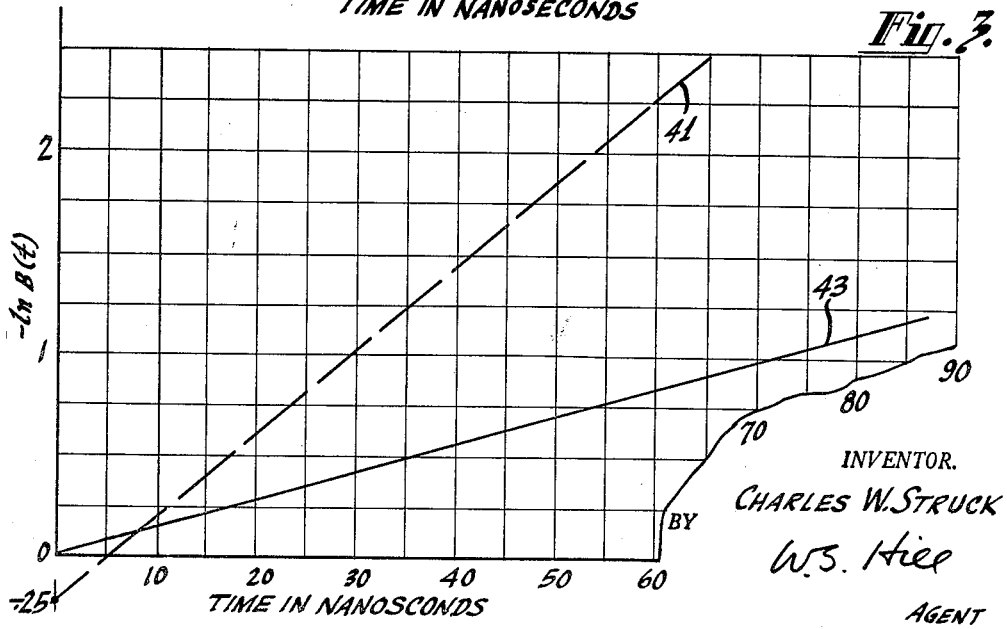
INVENTOR.
CHARLES W. STRUCK
BY
W.S. Hill
AGENT

United States Patent Office 3,104,226
Patented Sept. 17, 1963

3,104,226
SHORT LUMINESCENCE DELAY TIME
PHOSPHORS
Charles W. Struck, Lawrenceville, N.J., assignor to Radio Corporation of America, a corporation of Delaware
Filed May 29, 1961, Ser. No. 113,306
8 Claims. (Cl. 252—301.4)

This invention relates to improved phosphors which, when excited with cathode rays, emit ultraviolet light in the region of about 3400 A.U. (Angstrom units). The invention relates particularly to such cathodoluminescent phosphors which exhibit a very short luminescence decay time after the exciting cathode rays are removed.

Some known phosphors which emit ultraviolet light in the region below about 4000 A.U. upon cathode ray excitation are the ZnO:Zn phosphor used in the P-15 screen, and the cerium-activated calcium-magnesium silicate phosphor used in the P-16 screen. Such phosphors have a very short luminescence decay time and find their use in cathode ray tubes used as flying spot scanners, and in sensing-type multicolor kinescopes. In such applications, it is desirable to provide phosphors with still shorter luminescence decay times. In other applications, for example where high frequency modulability is essential, it is desirable to provide a phosphor with a very fast decay time.

As used in this specification, very short luminescence decay time means that the value of $\tau$ which is defined in detail below is less than $5 \times 10^{-8}$ seconds or 50 nanoseconds. The phosphor must also be chemically-stable to excitation by cathode rays. The phosphor should exhibit a reasonable luminescence brightness, although this latter requirement is not critical.

The phosphors of the invention satisfy the foregoing requirements and comprise cerium-activated orthophosphates of at least one member of the group consisting of lanthanum, yttrium, and lutetium. Luminescence decay times in the order of 30 nanoseconds and emissions in the region of 3400 A.U. have been observed for phosphors of the invention.

The invention is more completely described in the following portion of the specification with reference to the drawing in which:

FIGURE 1 is a typical cathode ray tube which includes a screen comprising the phosphor of the invention, FIGURE 2 is a graph including a pair of curves illustrating the luminescence decay of the phosphor of the invention and of a prior art phosphor, and FIGURE 3 is a graph including a pair of curves used to compute the luminescence decay time $\tau$ of the phosphors described in FIGURE 2.

*Example.*—Mix an aqueous solution of lanthanum nitrate with an aqueous solution of cerium nitrate in proportions such that the mol ratio of Ce/La in the mixed solution is about 0.01. The mixed solution is made as neutral as possible without precipitating any of the lanthanum or cerium. This may be done by adding limited quantities of an aqueous solution of sodium hydroxide NaOH to the mixed solution. Aqueous solutions of other bases, such as ammonium hydroxide $NH_4OH$ or potassium hydroxide KOH, may be used in place of the sodium hydroxide solution. The pH of the mixed solution, as neutralized, will be about 5. Then, an aqueous solution of ammonium hydrogen phosphate $(NH_4)_2HPO_4$ is added to the mixed solution with constant stirring to produce a coprecipitate of lanthanum and cerium phosphates. The coprecipitate is collected by filtration and dried at about 100° C. in air. The dried coprecipitate is then fired in an atmosphere of nitrogen at about 1000° C. for about one hour and then cooled to room temperature. The fired product is the phosphor of the invention and has the molar composition $LaPO_4:0.01Ce$. This phosphor emits ultraviolet light which peaks spectrally at about 3400 A.U. when excited with cathode rays. The luminescence decay time from the peak brightness is about 24 nanoseconds as shown in the table.

There are many variations to the foregoing process of the example. Lanthanum may be replaced with yttrium, lutetium, or mixtures of two or more of lanthanum, yttrium, or lutetium. The mol ratio of Ce/La may be varied between 0.0001 and 0.10, but is preferably 0.01. The same mol ratios apply where La has been replaced as described above. The drying temperature and time are not critical and may be any convenient drying temperature and time. The firing temperature may be between 900° and 1200° C., preferably 1000° C. The firing atmosphere may be any non-oxidizing atmosphere, such as nitrogen, hydrogen, helium, argon, or mixtures thereof. The firing atmosphere may also be oxidizing, such as air. The firing time may be between 10 minutes and 5 hours, but it is preferably one hour at the preferred temperature of 1000° C.

The phosphors of the invention may be defined as cerium-activated orthophosphates of at least one member of the group consisting of lanthanum, yttrium, and lutetium. The molar composition of the phosphors is $MPO_4:xCe$, wherein M is one member of the group consisting of La, Y, Lu, and mixtures thereof, and $x$ is between 0.0001 and 0.1 mol. Some examples are $LaPO_4:0.01Ce$, $YPO_4:0.01Ce$, $LuPO_4:0.01Ce$, $LaPO_4:0.06Ce$, (La, Y) $PO_4:0.005Ce$, $YPO_4:0.005Ce$, (La, Lu) $PO_4:0.004Ce$, and (La, Y, Lu) $PO_4:0.01Ce$.

The phosphor of the invention may be used as a luminescent component in the luminescent screen in a cathode ray tube 21 as illustrated in FIGURE 1. The tube 21 comprises a closed glass envelope 23 including a face plate 25. On the inside surface of the face plate 25 is a thin layer or screen 27 comprising the phosphor of the invention. At the opposite end of the tube 21 is a cathode 29 which provides a source of cathode rays for exciting the screen 27. The luminescence from the screen may be conducted through the face plate 27 as in the flying spot scanner, or it may be conducted toward the cathode 29 as in the sensing type kinescope.

The luminescence decay characteristic of the $LaPO_4:0.01Ce$ phosphor of the example is illustrated by the curve 31 of FIGURE 2. The curve 31 was obtained from a cathode ray tube having the structure of the cathode ray tube of FIGURE 1. The outside of the faceplate 25 was masked except for a slit 0.002 inch by 1.00 inch. The cathode ray beam was focussed to an area less than 0.002 inch diameter. The cathode ray beam was made to scan across the 0.002 inch dimension of the slit in less than 2 nanoseconds. The luminescence emission from the slit was detected by a photomultiplier whose output was amplified and displayed on an oscilloscope. The luminescence output rose to a maximum about 20 nanoseconds after the excitation ceased and then decayed. A curve 33 for a $Ca_2MgSi_2O_7:Ce:Li$ phosphor as in a P-16 screen under similar conditions is illustrated for purposes of comparison. It will be noted that the curve 33, while considered very fast by ordinary standards, exhibits a longer and higher tail and therefore requires a longer time to decay than the curve 31.

The value of the luminescence decay time $\tau$ for these two phosphors was computed from the decay portion of curves 31 and 33. From roughly 20 nanoseconds after the peak output occurs, the behavior of the light output with time follows the relationship:

$$B(t) = B(o)e^{-t/\tau}$$

Consequently, a plot of $-\ln B(t)$ against $t$ is a straight line. The slope of this line is the inverse of the luminescence decay time $\tau$. Such a plot is given for both the $LaPO_4$:Ce screen and for P–16 screen by the curves 41 and 43 respectively in FIGURE 3. The luminescence decay times computed from these two straight lines are 24 nanoseconds for the $LaPO_4$:Ce screen and 72 nanoseconds for the P–16 screen. The table compares these and other phosphors in terms of typical values of luminescence decay time $\tau$.

TABLE

| Phosphor | Screen | $\tau$ (nanoseconds) |
|---|---|---|
| $LaPO_4$:0.01Ce | | 24 |
| $YPO_4$:0.01Ce | | ~24 |
| $Ca_2MgSi_2O_7$:Ce:Li | P–16 | 72 |
| ZnO:Zn | P–15 | ~200 |

What is claimed is:

1. A phosphor consisting essentially of a cerium-activated orthophosphate of at least one member of the group consisting of lanthanum, yttrium, and lutetium, said cerium being present in proportions between 0.0001 and 0.1 mol per mol of said member.

2. A phosphor consisting essentially of lanthanum orthophosphate activated with 0.0001 to 0.1 mol cerium per mol lanthanum.

3. A phosphor consisting essentially of yttrium orthophosphate activated with 0.0001 to 0.1 mol cerium per mol yttrium.

4. A phosphor having the molar composition, $MPO_4$:$x$Ce, wherein M is one member of the group consisting of La, Y, Lu, and mixtures thereof, and $x$ is 0.0001 to 0.1 mol.

5. A phosphor having the molar composition $LaPO_4$:$x$Ce wherein $x$ is 0.0001 to 0.1 mol.

6. A phosphor having the molar composition $LaPO_4$:0.01Ce.

7. A phosphor having the molar composition $YPO_4$:$x$Ce, wherein $x$ is 0.0001 to 0.1 mol.

8. A phosphor having the molar composition $YPO_4$:0.01Ce.

References Cited in the file of this patent
UNITED STATES PATENTS 2,467,689    Overbeek            Apr. 19, 1949

FOREIGN PATENTS 512,154    Great Britain        Aug. 30, 1939